United States Patent
Schwegler et al.

[11] Patent Number: 5,808,372
[45] Date of Patent: Sep. 15, 1998

[54] IGNITION KEY-VEHICLE COMMUNICATION DEVICE WHICH IS PROTECTED AGAINST INCORRECT OPERATION

[75] Inventors: Günter Schwegler, Weinstadt; Horst Brinkmeyer, Waiblingen, both of Germany

[73] Assignee: Mercedes-Benz AG, Germany

[21] Appl. No.: 738,702

[22] Filed: Oct. 28, 1996

[30] Foreign Application Priority Data

Oct. 26, 1995 [DE] Germany .................. 195 39 852.1

[51] Int. Cl.[6] .................... B60R 25/00; G06F 7/04
[52] U.S. Cl. ............ 307/10.3; 307/10.4; 307/10.5; 340/825.31; 340/825.72; 701/36
[58] Field of Search ............... 307/9.1, 10.1, 307/10.2, 10.3, 10.4, 10.5, 10.6, 10.7, 10.8; 340/825.31, 825.32, 825.34, 825.67, 825.72, 825.54, 426; 180/287; 70/256, 257; 123/198 B, 198 DB, 198 DC; 364/423.098, 423.099, 424.034, 424.37, 424.38, 424.04, 424.045, 424.059

[56] References Cited

U.S. PATENT DOCUMENTS

| 4,383,242 | 5/1983 | Sassover et al. . |
| 5,055,701 | 10/1991 | Takeuchi ................ 307/10.2 |
| 5,247,279 | 9/1993 | Sato . |
| 5,561,420 | 10/1996 | Kleefeldt ................ 307/10.5 |
| 5,596,317 | 1/1997 | Brinkmeyer ............ 307/10.2 |

FOREIGN PATENT DOCUMENTS

| 42 38 042 | 5/1994 | Germany . |
| 44 11 449 | 3/1995 | Germany . |
| 44 11 450 | 3/1995 | Germany . |
| 44 11 451 | 5/1995 | Germany . |
| 19500999C1 | 1/1996 | Germany . |
| 2 291 242 | 6/1994 | United Kingdom . |
| 2 289 719 | 5/1995 | United Kingdom . |

OTHER PUBLICATIONS

Search Report dated Jan. 17, 1997.

*Primary Examiner*—Brian Sircus
*Assistant Examiner*—Peter Ganjian
*Attorney, Agent, or Firm*—Evenson, McKeown, Edwards & Lenahan P.L.L.C.

[57] ABSTRACT

The invention provides an ignition key-vehicle communication device having at least one electronic key which can be inserted into a vehicle-end ignition lock. A wireless key-vehicle communication component arranged on the key actuates at least one vehicle-end functional unit by activating an activation element which is arranged at the key end. To protect against incorrect operation, means are provided for detecting when a key is inserted into the ignition lock and/or is inserted in a specific position in the ignition lock, and disabling communication between this key and the functional unit to be actuated in response thereto. The means for protecting against incorrect operation are arranged on the key.

10 Claims, 1 Drawing Sheet

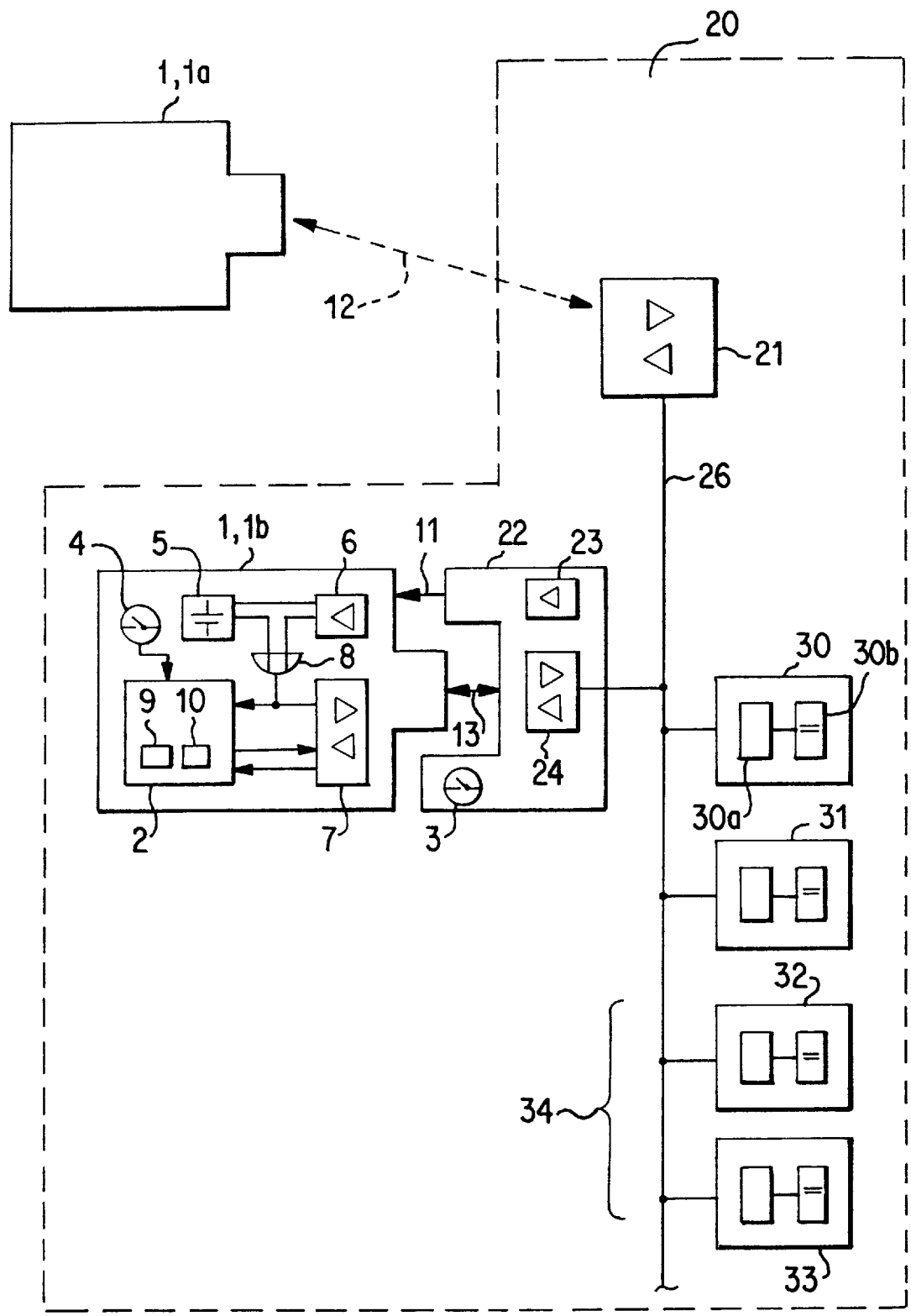

IGNITION KEY-VEHICLE COMMUNICATION DEVICE WHICH IS PROTECTED AGAINST INCORRECT OPERATION

BACKGROUND AND SUMMARY OF THE INVENTION

The invention relates to an ignition key-vehicle communication device which is protected against incorrect operation. In such devices, the ignition key is configured as an electronic key, and serves a dual purpose. On the one hand it is used to start the vehicle. For this purpose it communicates with the ignition lock in a mechanical, electrical (hard wired) or wireless fashion in order to prove the driving authorization. On the other hand, it also serves as a portable remote-control unit for remote actuation of at least one functional unit on board the vehicle, usually from outside the vehicle via a wireless communication channel between the ignition key and vehicle.

The actuation of one or more vehicle-protection functions via wireless communication channels between the electronic key and vehicle is a particularly significant feature. Modern vehicle-protection devices contain both electronically actuatable access-protection devices, such as door-locking systems or flap-locking systems and break-in/theft warning systems, as well as electronically actuatable vehicle immobilizing devices for protecting against unauthorized use by third parties. The actuation of the associated functional units is triggered by activating the associated key-end activation element, and involves a unidirectional or bidirectional exchange of data between the key and vehicle via the wireless communication channel, in order to check the authorization of the requesting key for the respective vehicle. Owing to the type of vehicle functions to be actuated, the wireless communication channel is usually configured with sufficient range so that the actuation can also be triggered with a key which is several meters away from the vehicle. The transmission medium used are preferably electromagnetic waves, specifically in the invisible range, e.g. in the infrared range, and in the radiowave range.

In these ignition key-vehicle communication devices, there is generally the risk of improper or incorrect operation due to unintentional manipulation of the activation element which is arranged on the ignition key. In this event, the corresponding vehicle function (for example, locking or unlocking of the vehicle doors, opening of the trunk or deactivation or setting of an electronic immobilizer), is triggered inadvertently, and possibly without immediate detection by the vehicle operator. Such incorrect operation of this kind can arise particularly easily when the ignition key is inserted into the ignition lock and turned to start or switch off the engine. Actuation of the respective vehicle function as a result of such incorrect operation usually has extremely undesired consequences, particularly in operating situations in which traffic safety is endangered. Thus, there is a need for appropriate protection against incorrect operation. For example, it should be ensured that, after an immobilizer has been deactivated, it is not thereafter unintentionally set when the ignition is switched on, as a result of the key being subsequently activated in the ignition lock.

In order to prevent such incorrect operation, it is known to provide means arranged on the vehicle for detecting whether the key is inserted into the ignition lock, and/or whether the key is in a specific position in the ignition lock (for example, the position for switched-on ignition). Appropriate information is transmitted to the vehicle mounted component of the wireless communication channel for the actuation of the vehicle functional unit which has been requested by the user. In the vehicle mounted communication component, this communication channel is then blocked if it is detected that the ignition key is inserted into the ignition lock and/or is in a specific position in the ignition lock.

A device of this type is described in U.S. Pat. No. 4,383,242, in which the ignition signal is used, as a detection signal for determining whether the ignition key is in the ignition lock in the position for switched-on ignition. This information is provided to logic gates of a vehicle mounted communication component of a wireless ignition key-vehicle communication channel. By suitable linking of the signals, the gates ensure that actuation signals emitted by the ignition key due to inadvertent activation of the associated activation element on the ignition key (and received at the vehicle end via the wireless communication channel) are not transmitted for the actual actuation of the corresponding vehicle function (specifically a vehicle-protection function), as long as the ignition is switched on. Alternatively, it is also possible to disable the vehicle mounted receiver associated with the wireless ignition key-vehicle communication channel whenever the means which are arranged aboard the vehicle detect that the key is inserted into the ignition lock and/or is in a specific position in the ignition lock.

The vehicle borne arrangement of the means for detecting an ignition key which is inserted into the ignition lock and the vehicle borne blocking of the aforesaid communication channel when the key is in the ignition lock have the following, possibly undesired, properties. First, an electrical connection is necessary between the ignition lock or the ignition key-detecting means arranged there and each unit whose actuation is to be disabled via the wireless ignition key-vehicle communication channel. Each such unit must also be configured to disable or ignore data signals received via the communication channel. This means for example a correspondingly large outlay when a plurality of vehicle mounted control units are included in a vehicle-protection device that is to be remotely actuated via this communication channel.

Furthermore, it is important to note that, with this conventional procedure for vehicle-end blocking of the communication channel, intentional actuation of the respective vehicle-end function by means of another key associated with the vehicle is no longer possible. Such an actuation requirement may occur for example if a person is in the vehicle and has inserted the ignition key into the ignition lock and another person having an authorized key wishes for example, to open, the trunk by triggering the remote control function, (that is, activating the wireless key-vehicle communication channel), in order to load or unload a piece of luggage, or wishes to unlock a door by remote control when the person who has previously entered the vehicle has unlocked only his own door.

German patent document DE-OS 42 38 042 A1 discloses a key-vehicle communication device with a wireless communication channel for user-requested actuation of a central locking system. The key contains an associated transmitter which can be actuated, via an opening button and a closing button arranged on the housing of the key, in order to emit an opening or closing instruction signal. As a protection against incorrect operation, the opening button, and possibly also the closing button, are positioned so that the opening button is covered by a foldable key bit connected to the key housing in the folded-in state of the said key bit. Alternatively, the opening button can be operated only indirectly, by pressing on the key bit which has been folded in or out. This type of protection against incorrect operation cannot be used with electronic keys, which lack a mechanical key bit.

The object of the present invention is to provide an ignition key-vehicle communication device of the type described above, in which, with relatively little outlay, convenient protection is achieved against incorrect operation (specifically inadvertent actuation of the remotely actuatable functional unit due to accidental operation of the activation element arranged on the ignition key while the ignition key is being handled in the ignition lock). This protection makes it possible, in particular, to use the wireless key-vehicle communication channel to actuate one or more vehicle-end functional units with another authorizing key despite an ignition key being inserted into the ignition lock.

This object is achieved by the ignition key-vehicle communication device according to the invention, in which the means for detecting whether an ignition key is inserted into the ignition lock and/or is in a specific position in the ignition lock, is arranged in the key, and acts with corresponding detection information on the key-borne segment of the wireless key-vehicle communication channel. Thus, the key-borne segment is prevented from transmitting data which actuate the respective functional unit, whenever the key is inserted into the ignition lock or is in a specific position in the ignition lock. In this manner, when the ignition key is inserted into the ignition lock, its remote-control function is selectively kept inactive, either as a whole, or in any event with respect to the actuation of the respective vehicle-end functional unit which is to be protected by this key against unintentional actuation. On the other hand, as a result of activation of the corresponding activation element on another authorizing key, the wireless key-vehicle communication channel can continue to be used and the one or more associated vehicle-end functions actuated correctly.

Advantageously, this protection against incorrect operation according to the invention does not require any modification of the vehicle electronics. The outlay on technical implementation is thus almost always less than in the case of the conventional, vehicle-borne protection against incorrect operation in which additional cable connections and parallel signal blocking measures are frequently necessary in a plurality of components at the vehicle end.

In a preferred embodiment of the invention, an external-energy transmission device, which supplies external energy from the vehicle to the electronic ignition key when it is in the ignition lock, is also used to detect at the key end whether a key is inserted into the ignition lock. This is possible in that external energy is present at the output of the external-energy receiver on the key precisely when the key is inserted into the ignition lock, and thus, the presence of such external energy can easily be sensed by a control unit on the key.

In another embodiment, a wireless, short-range key-ignition lock communication channel, which is operational precisely when the ignition key is inserted into the ignition lock, is also used to detect at the key end, whether the ignition key is inserted into the ignition lock, based on the fact that data information is being transmitted via this communication channel, which is registered by a key-end control unit. Such a wireless, short-range ignition key-ignition lock communication channel can contain for example an inductive or optical transmission link between the ignition lock and the ignition key inserted into it. In this manner, a unidirectional or bidirectional data communication is established in order to actuate a vehicle-protection device. For example, the actuation of an immobilizer may be implemented via this communication channel in such a way that the immobilizer is automatically deactivated when an authorized ignition key (which has the correct use-authorization code), is inserted into the ignition lock, and is automatically set again when the ignition key is withdrawn from the ignition lock.

These and other objects, features and advantages of the present invention will become more readily apparent from the following detailed description of the drawing wherein:

BRIEF DESCRIPTION OF THE DRAWINGS

The single FIGURE of the drawing is a schematic block diagram of an ignition key-vehicle communication device according to the invention, having a wireless key-vehicle communication channel with key-end protection against incorrect operation.

DETAILED DESCRIPTION OF THE DRAWINGS

As shown in the FIGURE, the invention comprises a plurality of access-authorizing and use-authorizing ignition keys for a given vehicle (20) which is indicated schematically. One such key (1) is shown, on the one hand in a position (1a) outside the vehicle, and on the other hand in a position (1b) inside the vehicle (20), inserted into the ignition lock (22) of the vehicle (20). The key (1) contains a control and logic unit (2) which has, inter alia, a memory component (9) for storing an access-authorization code and a memory component (10) for storing a use-authorization code. It also has one or (if appropriate) more control buttons (4) which are arranged on the key housing so that they can be activated by the user, thereby providing an activation signal to the logic and control unit (2); and a transmitter/receiver unit (7) for data communication with the vehicle via two different channels with wireless communication links (12, 13). A battery (5) supplies the key with its own power, while a receiver unit (6) receives external energy from the vehicle via a wireless energy-transmission link (11), and an OR gate (8) switches between the key's own power supply or an external power supply. On the vehicle, the energy-transmission device contains an energy transmitter (23) in the ignition lock (22). This energy-transmission link (11) is configured, for example, as an alternating magnetic field, so as to transmit energy (and thus a supply of external power) to the key (1) precisely when it is inserted into the ignition lock (22). In addition, the battery (5) can be recharged at the same time, if necessary. When the ignition key (1) is withdrawn from the ignition lock (22), it is supplied with energy by the battery (5).

A first wireless key-vehicle data communication channel (12) is provided by the control and logic unit (2) and the transmitter/receiver unit (7) contained in the key, and a corresponding transmitter/receiver unit (21) mounted on the vehicle. Between them a communication link (12), preferably an infrared or radio-transmission link, has a range sufficient to maintain the communication channel operational even when the key (1) is at a distance of several meters from the vehicle (20). This longer range communication channel provides data communication between the key (1) and vehicle (20) for actuating access-protection devices, such as a central locking system and break-in/theft warning system, as well as, if appropriate, further special functions (not explicitly represented), for example opening a rear lid. Data communication for actuating the respective vehicle-end functional unit is initiated in a remote-controlled fashion by appropriately pressing the control button (4) on the key (1). If required in order to increase its operational reliability, this communication channel can be configured redundantly, with the simultaneous use of an infrared link and a radio transmission link.

As long as the key (1) is not inserted into the ignition lock (22), and thus the function for protecting against incorrect operation explained below is not active, the control and logic unit (2) responds to a depression of the control button (4) by generating an actuation signal containing the access authorization code stored in the memory component (9). This signal is transmitted over the associated communication link (12) via the transmitter/receiver unit (7), received by the vehicle-end transmitter/receiver unit (21), and fed onto a common data line (26) for communication to the respective vehicle-end functional units (30–33). For example, to actuate the central locking system, the signal is transmitted on the data line (26) to a control unit (30) of the central locking system (not shown). There the access authorization code contained in the signal is decoded by a decoder (30a) and checked by a downstream comparator (30b) to determine whether it corresponds to a code stored in the control unit (30). If so, the control unit (30) unlocks or locks of the doors or flaps of the vehicle (20).

In an analogous fashion, the actuation signal is fed via the common data line (26) to a control unit (31) of the break-in/theft warning system (not shown) where it is determined by means of a decoder and a comparator, whether the supplied access authorization code is correct. If so, the control unit (31) deactivates or activates the alarm system.

In this way, the central locking system can be switched into the unlocked position and the break-in/theft warning system deactivated by a first activation of the remote-control button (4) on the access-authorizing key (1), in order to enter the vehicle. Conversely, after a person gets out of the vehicle, the central locking system can be switched back into the locked state and the alarm system activated, via a second activation of the remote-control button. The data communication which is used to actuate the one or more vehicle functions via this communication channel can take place in a unidirectional or bidirectional fashion, any desired cryptographic method being preferably used to encrypt the transmitted data information, as described for example in German patent documents DE 44 11 449 C1, DE 44 11 450 C1 and DE 44 11 451 C1.

When the key (1) is inserted into the ignition lock (22), an appropriately designed electrical switch contact (3) on the ignition lock (22) is thereby automatically activated, causing the ignition lock (22) to detect that a key (1) is inserted. Alternatively, insertion of the key (1) can be detected, for example via a permanent magnet in the key and a Hall sensor in the ignition lock, or by the ignition lock's continuously or cyclically emitting energy and awaiting a response from an inserted key, as soon as an access door has been activated.

After it has been detected that a key (1) is inserted, the ignition lock (22) activates its energy transmitter (23), which transmits energy via the energy-transmission link (11) to the energy receiver (6) in the key (1), so that external energy is now present at the output of the energy receiver (6). The control and logic unit (2) senses this presence of external energy via the OR gate (8), and thus detects unambiguously that the key (1) is in position (1bb) (that is, inserted into the ignition lock (22)). Thereafter, a single data communication enables the use-authorization via a second wireless key-vehicle communication channel (an ignition key-ignition lock communication channel), which comprises the key-borne transmitter/receiver unit (7), a corresponding transmitter/receiver unit (24) in the ignition lock (22) and a bidirectional infrared data-transmission link (13) therebetween.

As is apparent from the above, at the key end, in this example, this second communication channel uses the same communication component (7) as is sued by the first (key-vehicle) communication channel for actuating the access-protection functions. The ignition lock transmitter-receiver unit (24) on the other hand is concealed in the ignition lock itself in such a way that the associated infrared data-transmission link has only a small range for example, approximately 2 cm so that this communication channel is operational only when the ignition key (1) is inserted into the ignition lock (22). This increases the protection of this communication channel against operational faults and unauthorized tampering, such as attempts at tapping. If appropriate, instead of optical waves other electromagnetic waves are also suitable as the transmission medium.

As part of the data communication, the control and logic unit (2) generates a use-authorization signal which contains the use-authorization code stored in the respective memory component (10), and transmits this signal via the transmitter/receiver unit (7) and the associated data-transmission link (13) to the transmitter/receiver unit (24) of the ignition lock (22), from which it is fed onto the common data line (26), and thence to those systems, in particular control units, associated with the immobilizer (34) of the vehicle (20). For example, the FIGURE shows an engine control unit (32) and a gearbox control unit (33) which, like other vehicle components (not shown) associated with the immobilizer (34), in turn check the incoming use-authorization code, by means of a decoder and a downstream comparator, to determine correspondence with a use-authorization code stored in each case in the respective component. A further component which is associated with the immobilizer (34) may be, for example, an electric steering lock.

If there is correspondence of codes, a previously activated blocking function is cancelled in each of the components associated with the immobilizer (34), causing the immobilizer to be deactivated in its entirety so that the vehicle can subsequently be started. Later switching-off of the ignition is detected via the ignition line voltage, after which the immobilizer is automatically reset by the associated, vehicle-end assemblies (32, 33) going into their operation-blocking state. The described manner of actuating of the immobilizer function via the short-range ignition key-ignition lock communication channel ensures automatically that the immobilizer cannot be set unintentionally as long as the key (1) is in the ignition lock (22).

If, as described, data communication via the ignition key-ignition lock communication channel for actuating the immobilizer function is bidirectional, an encryption method which operates bidirectionally can be used to transfer the use-authorization code from the key (1) to the vehicle (20). Furthermore, in the latter case, it may be provided if desired, that data communication for deactivating the immobilizer can be executed only when the key (1) has been moved into a specific rotational position in the ignition lock (22). In this case, the automatic re-setting of the immobilizer can occur when the key (1) is moved back into its rotational "off" position in the ignition lock (22). Since data communication procedures via the ignition key-ignition lock communication channel can only occur when the key (1) is inserted into the ignition lock (22), the control and logic unit (2) can detect from the occurrence of such a communication that the key (1) is inserted into the ignition lock (22), as an alternative (or in addition) to sensing the presence of external energy.

As soon as the control and logic unit (2) senses the presence of external energy at the output of the external energy receiver (6) or an exchange of data via the short-range ignition key-ignition lock communication channel, it determines unambiguously that the key (1) is inserted into the ignition lock (22) and/or is in a specific rotational position therein. Thereafter, in order to provide protection against incorrect operation, the control unit (2) disables any emission, via the long-range key-vehicle communication channel (12), of actuation signals which contain the access-authorization code from the memory component (9) for actuating the access-protection devices and further special functions which can be triggered in a remote-controlled fashion, even if such an emission of data has been requested by pressing the control button (4).

This can take place with particularly little outlay, for example by programming the control and logic unit (2) to ignore the signal of the control button (4) if it detects that the key (1) is inserted into the ignition lock (22). Thus, inadvertent activation of the control button (4) of the ignition key (1) which is inserted into the ignition lock (22), and undesired activation of causing a corresponding vehicle function (for example a central locking function or an alarm system function as well as possible further special functions), are reliably prevented, with comparatively little outlay. At the same time, even if one ignition key (1) is inserted into the ignition lock (22), these functions can continue to be actuated effectively, in a desirable way, by activating the corresponding control button of a further ignition key which has an authorizing function for the vehicle. In contrast, with respect to the transmission of the use-authorizing data for releasing the immobilizer functions via the short-range infrared data-transmission link (13), the key-end communication component (2, 7) is activated if the key (1) is inserted into the ignition lock (22) and is, in this respect, kept inactive as long as the key (1) is not inserted into the ignition lock (22).

In addition to the example described, the invention of course comprises further ignition key-vehicle communication devices of the type mentioned previously which are modified in comparison with the example shown, and which each have the characteristic common features that the means for protecting against incorrect operation of the activation element or elements on the key, and thus for protecting against inadvertent actuation of the one or more associated vehicle-end functions, are arranged at the key end, and block the transmission of the respective actuation data selectively at the key end when the key is inserted into the ignition lock, while the vehicle-end component of the associated communication channel remains operational in order to communicate with other keys.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Ignition key-vehicle communication arrangement for a vehicle having at least one remotely actuatable vehicle function, said arrangement comprising:

at least one ignition key which can be inserted into an ignition lock in said vehicle;

a communication component arranged on said ignition key for transmitting enabling data which actuate said at least one vehicle function;

an activation element arranged on the ignition key for causing said communication component to transmit data which actuate said at least one vehicle function; and means for protecting against incorrect operation of said at least one vehicle function, said means comprising:
  means for detecting insertion of said ignition key into a position in said ignition lock;
  means responsive to a detection of said insertion of said ignition key, for disabling transmission of said enabling data by said communication component arranged on said ignition key.

2. Communication arrangement according to claim 1, wherein said position in said ignition lock comprises one of:
  presence of said ignition key in said ignition lock in any position therein; and
  orientation of said ignition key in a predetermined position in said ignition lock.

3. Communication arrangement according to claim 1, wherein said ignition key is an electronic key.

4. Communication arrangement according to claim 1, wherein said communication component comprises a wireless transmission device.

5. Communication arrangement according to claim 1, wherein said activation element is manually operable.

6. Communication arrangement according to claim 1, wherein:
  said ignition key further comprises an external energy receiver which is linked to receive energy from a vehicle borne energy source when said ignition key is inserted into a position said ignition lock; and
  said means for protecting against incorrect operation comprises a control unit arranged on said ignition key for detecting presence of external energy received by said energy receiver, and for disabling said communication component with respect to transmission of enabling data, in response thereto.

7. Communication arrangement according to claim 2, wherein:
  said ignition key further comprises an external energy receiver which is linked to receive energy from a vehicle borne energy source when said ignition key is inserted into a position said ignition lock; and
  said means for protecting against incorrect operation comprises a control unit arranged on said ignition key for detecting presence of external energy received by said energy receiver, and for disabling said communication component with respect to transmission of enabling data, in response thereto.

8. Communication arrangement according to claim 1 further comprising an ignition key-ignition lock communication channel for transmitting data to said vehicle when said ignition key is inserted into a position said ignition lock, wherein:
  said means for protecting against incorrect operation comprises a control unit arranged on said ignition key for detecting a data transmission on said ignition key-ignition lock communication channel and for disabling said communication component with respect to transmission of enabling data, in response thereto.

9. Communication arrangement according to claim 2 further comprising an ignition key-ignition lock communication channel for transmitting data to said vehicle when said ignition key is inserted into a position said ignition lock, wherein:

said means for protecting against incorrect operation comprises a control unit arranged on said ignition key for detecting a data transmission on said ignition key-ignition lock communication channel, and for disabling said communication component with respect to transmission of enabling data, in response thereto.

10. Communication arrangement according to claim 8, wherein said ignition key-ignition lock communication channel is a wireless communication channel.

* * * * *